United States Patent
Bisaiji et al.

(10) Patent No.: US 9,145,810 B2
(45) Date of Patent: Sep. 29, 2015

(54) DEVICE FOR PURIFYING EXHAUST GAS OF AN INTERNAL COMBUSTION ENGINE

(75) Inventors: Yuki Bisaiji, Mishima (JP); Koichiro Fukuda, Numazu (JP); Kazuhiro Itoh, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 983 days.

(21) Appl. No.: 13/141,253

(22) PCT Filed: Jan. 8, 2010

(86) PCT No.: PCT/JP2010/050451
§ 371 (c)(1),
(2), (4) Date: Jun. 21, 2011

(87) PCT Pub. No.: WO2010/079847
PCT Pub. Date: Jul. 15, 2010

(65) Prior Publication Data
US 2011/0252772 A1 Oct. 20, 2011

(30) Foreign Application Priority Data
Jan. 9, 2009 (JP) .................. 2009-004021

(51) Int. Cl.
*F01N 3/00* (2006.01)
*F01N 3/36* (2006.01)
(Continued)

(52) U.S. Cl.
CPC ..... *F01N 3/36* (2013.01); *F01N 3/035* (2013.01); *F01N 3/208* (2013.01); *F01N 13/02* (2013.01);
(Continued)

(58) Field of Classification Search
CPC ............ F01N 2610/00; F01N 2410/00; F01N 2470/00; F01N 3/36; F01N 2250/05; F01N 3/208; F01N 3/035; F01N 2610/1453; F01N 2470/18; F01N 13/02; Y02T 10/20; Y02T 10/24
USPC ............................. 60/286, 295, 301, 303, 324
See application file for complete search history.

(56) References Cited

U.S. PATENT DOCUMENTS 6,367,320 B1 * 4/2002 Kueper et al. ............... 73/114.71
8,371,114 B2 * 2/2013 Hayashi et al. .................. 60/317
2010/0083643 A1 4/2010 Hayashi et al.

FOREIGN PATENT DOCUMENTS

JP  A-2006-336588  12/2006
JP  A-2007-205308  8/2007
(Continued)

OTHER PUBLICATIONS

International Search Report for International Patent Application No. PCT/JP2010/050451, mailed on Apr. 20, 2010.
(Continued)

*Primary Examiner* — Thomas Denion
*Assistant Examiner* — Diem Tran (57) ABSTRACT

To homogeneously diffuse, in the exhaust gas, an additive that is fed into a device for purifying exhaust gas of an internal combustion engine. An upstream device for purifying exhaust gas and a downstream device for purifying exhaust gas are connected together through an exhaust pipe having a sectional area smaller than that of the upstream device for purifying exhaust gas and that of the downstream device for purifying exhaust gas, a connection passage portion is provided to connect the exhaust outlet of a catalyst in the upstream device for purifying exhaust gas to the exhaust pipe, the connection passage portion being so formed that the center axis of the upstream device for purifying exhaust gas in the direction in which the exhaust gas flows is not aligned with the center axis of the exhaust pipe in the direction in which the exhaust gas flows, injection means is arranged in the connection passage portion to inject the additive into the exhaust passage so that the additive arrives at the opposing wall surface of the connection passage portion.

10 Claims, 11 Drawing Sheets

(51) Int. Cl.
  *F01N 3/20* (2006.01)
  *F01N 13/02* (2010.01)
  *F01N 3/035* (2006.01)

(52) U.S. Cl.
  CPC ......... *F01N 2470/18* (2013.01); *F01N 2610/00* (2013.01); *F01N 2610/1453* (2013.01); *Y02T 10/24* (2013.01)

(56) References Cited

FOREIGN PATENT DOCUMENTS

| | | |
|---|---|---|
| JP | A-2008-127997 | 6/2008 |
| JP | A-2008-240722 | 10/2008 |
| JP | A-2008-248746 | 10/2008 |
| JP | A-2008-274878 | 11/2008 |
| JP | A-2008-309000 | 12/2008 |
| JP | A-2010-31719 | 2/2010 |
| WO | WO 2008/111254 A1 | 9/2008 |

OTHER PUBLICATIONS

Mar. 28, 2014 European Search Report issued in European Application No. 10729265.8.

International Search Report for International Patent Application No. PCT/JP2010/080451, mailed on Apr. 20, 2010.

* cited by examiner

DEVICE FOR PURIFYING EXHAUST GAS OF AN INTERNAL COMBUSTION ENGINE

TECHNICAL FIELD

This invention relates to a device for purifying exhaust gas of an internal combustion engine.

BACKGROUND ART

In a device for purifying exhaust gas of an internal combustion engine equipped with a diesel particulate filter (hereinafter referred to as "DPF"), a selective catalytic reduction DeNOx device (hereinafter referred to as "SCR device") or a NOx storage-reduction catalyst (hereinafter referred to as "NSR catalyst"), it is normal to arrange an additive feeding device for adding a reducing agent in the exhaust passage upstream of the DPF, SCR device or NSR catalyst so that the exhaust gas is purified upon reacting with the additive fed from the additive feeding device, in the DPF, SCR device or NSR catalyst. To prevent the pass-by of the additive through the DPF, SCR device or NSR catalyst and to effectively utilize the additive, it is preferable to mix the additive and the exhaust gas together to a sufficient degree and to widely diffuse the additive over the entire cross section of the exhaust passage.

Therefore, a diffuser board has been arranged downstream of the additive feeding device but upstream of the DPF, SCR device or NSR catalyst to mix the additive with the exhaust gas so that the additive was widely diffused over the whole cross section of the exhaust passage. However, means for arranging the diffuser board has resulted in an increase in the pressure loss of the exhaust gas flow.

Japanese Unexamined Patent Publication JP-A-2007-205308 discloses a device for purifying exhaust gas of an internal combustion engine by feeding a purifying agent from the upstream of the device for purifying exhaust gas provided in the engine exhaust passage in order to purify specific components in the exhaust gas, wherein provision is made of a tilted portion for gradually decreasing the sectional area of the exhaust passage, and the purifying agent is injected in the radial direction of the exhaust passage from an injection port disposed near the central portion of the exhaust passage near a portion where the exhaust gas converges through after passing through the tilted portion, in order to improve the diffusion of the purifying agent.

OUTLINE OF THE INVENTION

In the device for purifying exhaust gas of JP-A-2007-205308, it is described that the purifying agent is injected at a portion where the flow rate of the exhaust gas becomes a maximum, from near the center of the exhaust passage toward the radial direction, and therefore makes it possible to prevent the purifying agent from depositing on the inner walls of the exhaust passage. However, with this constitution, if the velocity of flow of the exhaust gas is high, the purifying agent that is injected is carried away by the exhaust gas flowing near the center of the exhaust passage and the diffusing performance may decrease.

It is an object of the present invention to provide means for homogeneously diffusing, in the exhaust gas, the additive that is fed into the device for purifying exhaust gas of an internal combustion engine.

According to the invention described in claim 1, a device for purifying exhaust gas of an internal combustion engine is provided, in which an upstream device for purifying exhaust gas and a downstream device for purifying exhaust gas provided in the engine exhaust passage are connected together through an exhaust pipe having a sectional area smaller than that of the upstream device for purifying exhaust gas and that of the downstream device for purifying exhaust gas, the device for purifying exhaust gas of an internal combustion engine including injection means provided between the upstream device for purifying exhaust gas and the downstream device for purifying exhaust gas, and for injecting into the exhaust passage an additive that reacts with the specific components in the exhaust gas, and a connection passage portion for connecting the exhaust outlet of a catalyst in the upstream device for purifying exhaust gas to the exhaust pipe; wherein the connection passage portion is so formed that the center axis of the upstream device for purifying exhaust gas in the direction in which the exhaust gas flows is not aligned with the center axis of the exhaust pipe in the direction in which the exhaust gas flows, the injection means is arranged in the connection passage portion so that the additive arrives at the opposing wall surface of the connection passage portion, and the additive is mixed into the exhaust gas.

That is, in a system having the upstream device for purifying exhaust gas in a stage preceding the DPF, SCR device or NSR catalyst of the invention of claim 1, the additive is fed into the connection passage portion of from the catalyst to the exhaust pipe that is provided between the catalyst of the upstream device for purifying exhaust gas in the preceding stage and the exhaust pipe. Namely, the additive is mixed into, and vaporized in, the exhaust gas by utilizing an intense whirling current generated in the connection passage portion of from the catalyst to the exhaust pipe. The interior of the connection passage portion from the catalyst to the exhaust pipe has a capacity larger than that of the exhaust pipe. While passing through the connection passage portion from the catalyst to the exhaust pipe, therefore, vaporization of the additive is promoted, and the additive is effectively mixed and vaporized due to the intense whirling current in the connection passage portion and the effect of squeezing the pipe at a portion joining to the exhaust pipe.

According to the invention described in claim 2, the device for purifying exhaust gas of an internal combustion engine described in claim 1 is provided, wherein the connection passage portion includes a passage portion which gradually decreases the sectional area of the passage from the sectional area of the exhaust outlet of the catalyst in the upstream device for purifying exhaust gas.

That is, in the invention of claim 2, the sectional area of the connection passage portion gradually decreases from the catalyst described in claim 1 toward the exhaust pipe. In this case, the additive is fed into the passage portion that is gradually decreasing so as to be mixed and vaporized in the exhaust gas by utilizing the intense whirling current generated in the connection passage portion from the catalyst to the exhaust pipe without causing a pressure loss of the exhaust gas. In this case the interior of the connection passage portion from the catalyst to the exhaust pipe also has a capacity larger than that of the exhaust pipe. While passing through the connection passage portion from the catalyst to the exhaust pipe, therefore, vaporization of the additive is promoted, and the additive is effectively mixed and vaporized due to the intense whirling current in the connection passage portion and the effect of squeezing the pipe at a portion joining to the exhaust pipe.

According to the invention described in claim 3, the device for purifying exhaust gas of an internal combustion engine described in claim 1 or 2 is provided, wherein provision is made of a bypass passage which joins to the connection passage portion detouring the upstream device for purifying exhaust gas, and the injection means injects the additive toward the joining portion.

That is, in the invention of claim 3, when provision is made of the bypass passage that joins the connection passage portion detouring the upstream device for purifying exhaust gas, the additive is added near the joining portion and is effectively mixed into the exhaust gas by utilizing the whirling current of the exhaust gas created by the confluence. To prevent the additive from clogging in the form of soot in the injection means, it is advantageous if the additive is injected along the direction in which the bypass flow enters into the connection passage portion.

According to the invention described in claim 4, the device for purifying exhaust gas of an internal combustion engine described in any one of claims 1 to 3 is provided, wherein the downstream device for purifying exhaust gas is provided with a catalyst that executes the selective catalytic reduction by adding urea, and the injection means injects the additive toward the lower end portion of the catalyst in the upstream device for purifying exhaust gas so as to come into collision with the lower end portion of the catalyst.

That is, in the invention of claim 4, when the downstream device for purifying exhaust gas is provided with the catalyst that executes the selective catalytic reduction by the addition of urea, no heat is generated by the urea even if the urea is so injected as to come in contact with the catalyst on the upstream side. Therefore, the urea is positively brought into collision with the catalyst on the upstream side to promote the hydrolysis of urea by utilizing the temperature of the catalyst bed on the upstream side to thereby improve the diffusion of ammonia formed by the hydrolysis in the exhaust gas. The diffusion performance can be further improved relying on the mixing effect of when the urea comes in collision with the catalyst on the upstream side.

According to the invention described in claim 5, the device for purifying exhaust gas of an internal combustion engine described in any one of claims 1 to 4 is provided, wherein a diffuser board is provided in the connection passage portion for promoting the mixing of the injected additive with the exhaust gas.

That is, in the invention of claim 5, when the additive is mixed and vaporized in the exhaust gas in the connection passage portion of from the catalyst to the exhaust pipe, the diffuser board is arranged in the connection passage portion to further promote the mixing of the additive into the exhaust gas. Since the velocity of flow is low in the connection passage portion, arrangement of the diffuser board causes only a small pressure loss. Therefore, the mixing of the exhaust gas and the additive can be promoted and homogenized within the connection passage portion, making it possible to shorten the length of the exhaust pipe downstream of the connection passage portion.

According to the invention described in claim 6, the device for purifying exhaust gas of an internal combustion engine described in any one of claims 1 to 5 is provided, wherein the connection passage portion is so formed that the center axis of the exhaust pipe in the direction in which the exhaust gas flows is not in parallel with, and does not intersect, the center axis of the upstream device for purifying exhaust gas.

That is, in the invention of claim 6, the connection passage portion is so formed that the center axis of the exhaust pipe in the direction in which the exhaust gas flows is not in parallel with, and does not intersect, the center axis of the upstream device for purifying exhaust gas. Namely, the intense whirling current that is generated being divided into two directions along the wall surfaces of the connection passage portion of from the catalyst on the upstream side to the exhaust pipe, is rendered to be asymmetric, and the whirling distance of the one whirling current is lengthened to further improve the effect of mixing the additive.

According to the invention described in claim 7, the device for purifying exhaust gas of an internal combustion engine described in any one of claims 1 to 6 is provided, wherein provision is made of control means for controlling the amount of injection or the interval of injection of when the additive is added, and the control means determines the injection conditions under which the injected additive does not form liquid film in the exhaust pipe based on the area of the exhaust passage wall surface on where the injected additive deposits and the temperature of the wall surface or the temperature of the exhaust gas, and elevates the temperature of the catalyst bed of the catalyst in the upstream device for purifying exhaust gas.

Injection of the additive has been controlled by taking into consideration only the temperature of the exhaust gas at the inlet of the catalyst of the downstream device for purifying exhaust gas. However, even when the additive is vaporizing just before the catalyst of the downstream device for purifying exhaust gas, it is probable that the liquid film is formed in the exhaust pipe just after the additive injection means causing the additive to remain or the soot to be deposited. Therefore, by taking into consideration the area on where the additive deposits, temperature of the wall at the position of deposition, amount of injection and interval of injection of the additive, it is attempted to elevate the temperature of the catalyst bed of the upstream device for purifying exhaust gas so that no liquid film forms in the exhaust pipe just after the additive injection means.

According to the invention described in claim 8, the device for purifying exhaust gas of an internal combustion engine described in any one of claims 1 to 7 is provided, wherein provision is made of a temperature sensor for measuring the temperature of the exhaust gas in the exhaust pipe downstream of the connection passage portion, and the measured temperature of the exhaust gas is corrected based on the latent heat of vaporization of the additive that is injected, in order to find the temperature of the upstream device for purifying exhaust gas.

That is, in order to prevent incorrect measurement caused by the deposition of additive and to accurately correct the latent heat of vaporization of the additive, it is desired that the exhaust gas temperature sensor is arranged in the exhaust pipe in which the additive has been reliably vaporized downstream of the connection passage portion. In the invention of claim 8, therefore, the temperature sensor is arranged in the exhaust pipe downstream of the connection passage portion, and the temperature of the upstream device for purifying exhaust gas is found by correcting the measured temperature based on the latent heat of vaporization of the additive.

According to the invention described in claim 9, the device for purifying exhaust gas of an internal combustion engine described in claim 1 or 2 is provided, wherein the additive is injected aiming at a curved portion of the opposing wall surface of the connection passage portion leading to the exhaust pipe.

This is advantageously enables the additive to come in contact with the wall surface of the connection passage portion over a wide range thereof favorably promoting the mixing and vaporization of the additive into the exhaust gas.

The inventions described in the above claims share the effect of homogeneously diffusing, in the exhaust gas, the additive that is fed into the device for purifying exhaust gas of an internal combustion engine.

BRIEF DESCRIPTION OF THE DRAWINGS

FIG. 18 is a view schematically illustrating the constitution of a still further embodiment of when the invention is applied to the device for purifying exhaust gas of an internal combustion engine, wherein FIG. 18(a) is a view from the direction of cross section of the connection passage portion 2, and FIG. 18(b) is a perspective view from a tilted upper side of the connection passage portion 2.

BEST MODE FOR CARRYING OUT THE INVENTION

Embodiments of the invention will now be described with reference to the accompanying drawings. In a plurality of the accompanying drawings, the same or corresponding members are denoted by the same reference numerals.

Figure 6:
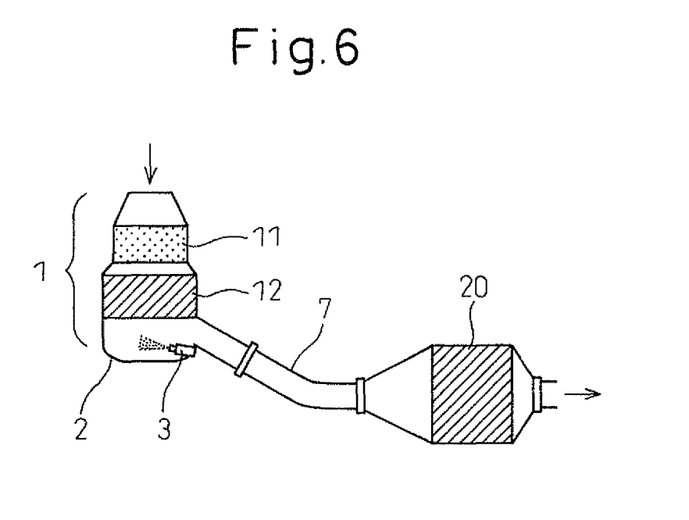
FIG. 6 is a view schematically illustrating the constitution of an embodiment of when the invention is applied to the device for purifying exhaust gas of an internal combustion engine.
Figure 7:
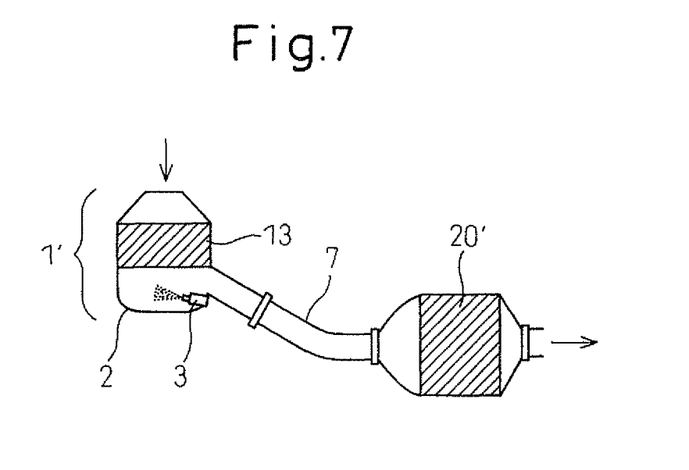
FIG. 7 is a view schematically illustrating the constitution of another embodiment of when the invention is applied to the device for purifying exhaust gas of an internal combustion engine.

FIGS. 6 and 7 illustrate the entire constitution of the apparatus for purifying exhaust gas of an internal combustion engine according to the invention. FIG. 6 shows an embodiment of the device for purifying exhaust gas of an internal combustion engine constituted by an oxidizing catalytic converter (hereinafter referred to as "CCo") 11, an NSR catalyst 12 and a DPF 20, and FIG. 7 shows an embodiment of the device for purifying exhaust gas of an internal combustion engine constituted by a DPF 13 and an SCR device or an NSR catalyst 20'. The device for purifying exhaust gas of an internal combustion engine according to the present invention includes an upstream device 1 or 1' for purifying exhaust gas provided in the engine exhaust passage, a downstream device 20 or 20' for purifying exhaust gas, and an injection means 3 provided between the upstream device 1 or 1' for purifying exhaust gas and the downstream device 20 or 20' for purifying exhaust gas and for injecting, into the exhaust passage, an additive that reacts with specific components in the exhaust gas. An exhaust pipe 7 is connecting the upstream device 1 or 1' for purifying exhaust gas to the downstream device 20 or 20' for purifying exhaust gas. The sectional area of the exhaust pipe 7 is smaller than the sectional areas of the upstream device for purifying exhaust gas and the downstream device for purifying exhaust gas. Here, a connection passage portion 2 is provided to connect the exhaust pipe 7 to the exhaust outlet of a catalyst 12 or 13 in the upstream device 1 or 1' for purifying exhaust gas.

Figure 8:
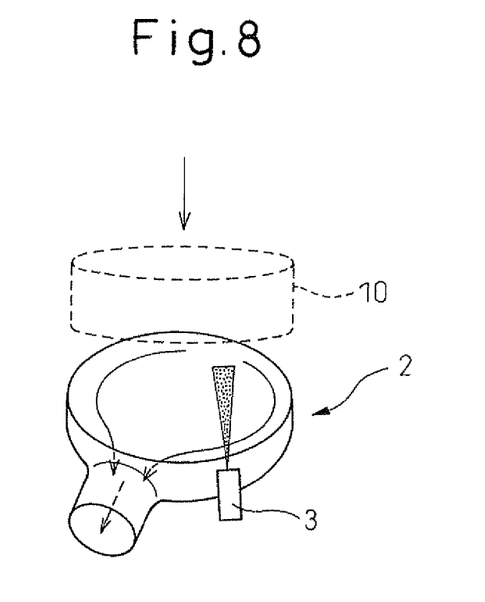
FIG. 8 is a view schematically illustrating the constitution of an embodiment of when the invention is applied to the device for purifying exhaust gas of an internal combustion engine.

FIG. 8 is a view illustrating the above-mentioned connection passage portion 2. A catalyst 10 in the upstream device for purifying exhaust gas shown in FIG. 8 corresponds to the catalyst 12 or 13 in the upstream device 1 or 1' for purifying exhaust gas of the embodiment of FIG. 6 or 7. That is, the connection passage portion 2 is so formed that the center axis of the upstream device for purifying exhaust gas in the direction in which the exhaust gas flows from the catalyst 10 is not in agreement with the center axis of the exhaust pipe 7 (see FIGS. 6 and 7) in the direction in which the exhaust gas flows. The injection port of the injection means 3 is disposed so as to inject the additive into the connection passage portion 2, and the injection pressure of the injection means is set to such a pressure that the additive injected when the engine is in operation arrives at the opposing wall surface of the connection passage so that the additive that is injected is effectively mixed into the exhaust gas being carried by the whirling current of the exhaust gas.

That is, in a system having the upstream device for purifying exhaust gas on a stage preceding the DPF, SCR device and NSR catalyst, the additive is fed into the connection passage portion 2 leading to the exhaust pipe 7 from the catalyst 10 provided between the catalyst 10 in the upstream device for purifying exhaust gas of the preceding stage and the exhaust pipe 7 (see FIGS. 6 and 7). The additive is then mixed and vaporized in the exhaust gas by utilizing the intense whirling current generated in the connection passage portion 2 of from the catalyst 10 to the exhaust pipe 7 without causing pressure loss of the exhaust gas. The interior of the connection passage portion 2 of from the catalyst 10 to the exhaust pipe 7 has a capacity larger than that of the exhaust pipe 7. Upon passing through the connection passage portion 2 of from the catalyst 10 to the exhaust pipe 7, vaporization of the additive is promoted and the additive is effectively mixed and vaporized by the intense whirling current in the connection passage portion 2 and by the effect of squeezing the pipe at the portion joining to the exhaust pipe.

Figure 1:
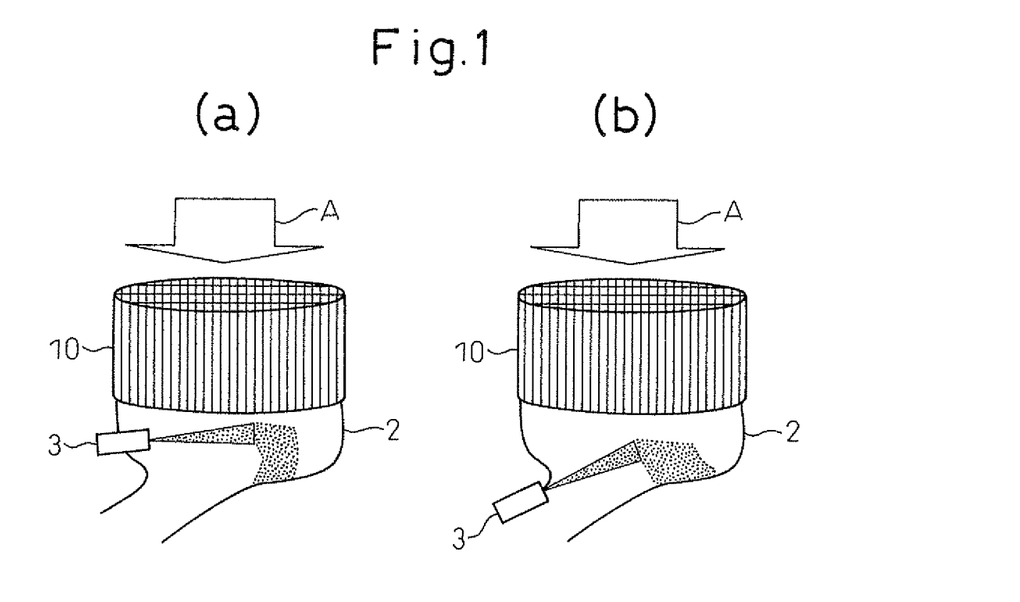
FIGS. 1(a) and 1(b) are views schematically illustrating the constitution of an embodiment of when the invention is applied to a device for purifying exhaust gas of an internal combustion engine.

In this case as shown in FIGS. 1(a) and (b), it is desired that the connection passage portion 2 is a passage portion in which the sectional area of the passage gradually decreases from the sectional area of the exhaust outlet of the catalyst 10 in the upstream device for purifying exhaust gas; and that the injection port of the injection means 3 is so disposed as to inject the additive into the passage portion of which the sectional area gradually decreases.

That is, as shown in FIGS. 1(a) and (b), the sectional area gradually decreases in the connection passage portion 2 of from the catalyst 10 to the exhaust pipe 7, and the additive is fed into the passage portion of which the diameter gradually decreases. The additive is then mixed and vaporized in the exhaust gas by utilizing the intense whirling current generated in the connection passage portion 2 of from the catalyst 10 to the exhaust pipe 7 without causing pressure loss of the exhaust gas. In this case, too, the interior of the connection passage portion 2 from the catalyst 10 to the exhaust pipe 7 has a capacity larger than that of the exhaust pipe 7. Upon passing through the connection passage portion 2 of from the catalyst 10 to the exhaust pipe 7, vaporization of the additive is promoted and the additive is effectively mixed and vaporized by the intense whirling current in the connection passage portion 2 and by the effect of squeezing the pipe at the portion joining to the exhaust pipe.

Further, as shown in FIGS. 1(a) and (b), it is desired that the injection pressure of the injection means 3 is such that the additive injected when the engine is in operation arrives at the opposing wall surface of the connection passage portion 2.

Figure 2:
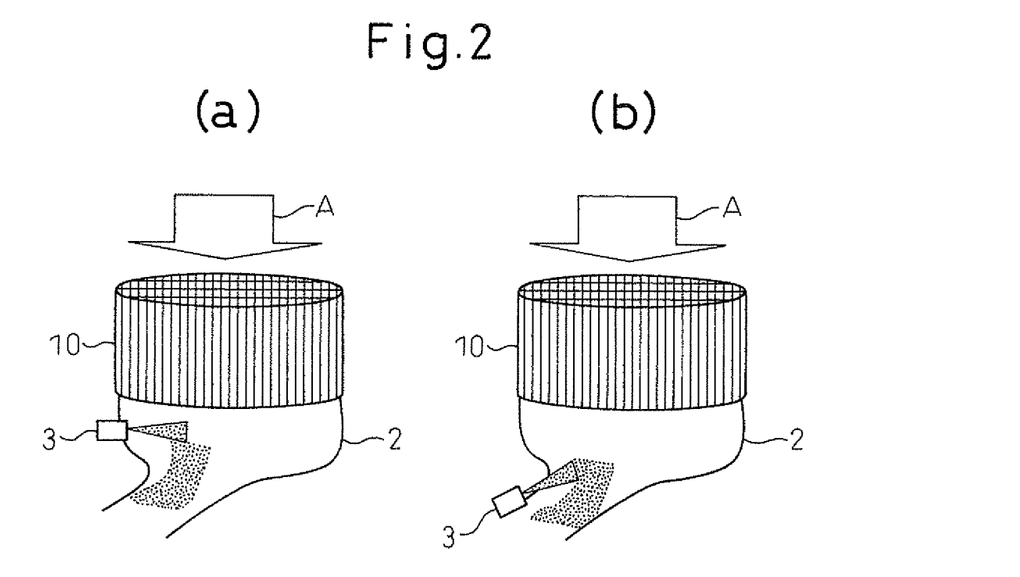
FIGS. 2(a) and 2(b) are views schematically illustrating the constitution of an embodiment which causes inconvenience.

FIGS. 2(a) and (b) illustrate a case where the injection pressure is not sufficient. FIG. 2(a) corresponds to FIG. 1(a) and FIG. 2(b) corresponds to FIG. 1(b) concerning the arrangement of the injection means 3. In the case of FIGS. 2(a) and (b) where the injection pressure is not sufficient, however, the additive that is injected is discharged into the exhaust pipe 7 without utilizing the intense whirling current generated in the connection passage portion 2, and cannot be sufficiently mixed and vaporized in the exhaust gas.

Figure 3:
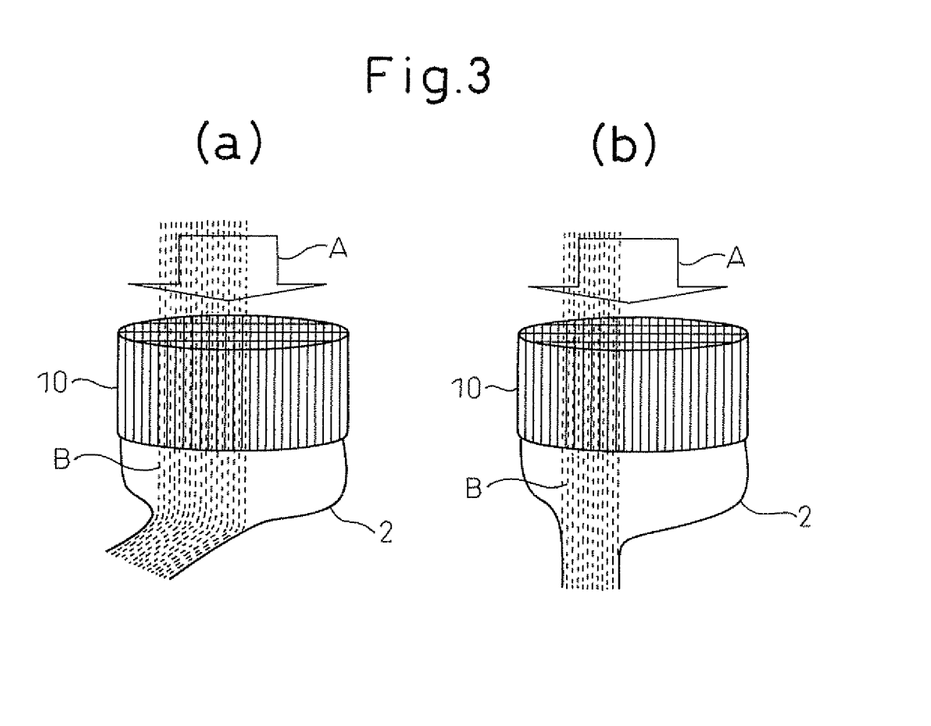
FIGS. 3(a) and 3(b) are views illustrating the ranges to be avoided when the invention is applied to the device for purifying exhaust gas of an internal combustion engine.

That is, referring to FIGS. 3(a) and (b), the exhaust gas A flowing through the whole catalyst 10 includes a flow B that directly flows out into the exhaust pipe from the connection passage portion 2. When the injection pressure is small as in FIGS. 2(a) and (b), therefore, the injected additive flows out being carried by the flow B and cannot be sufficiently mixed into the exhaust gas.

Figure 4:
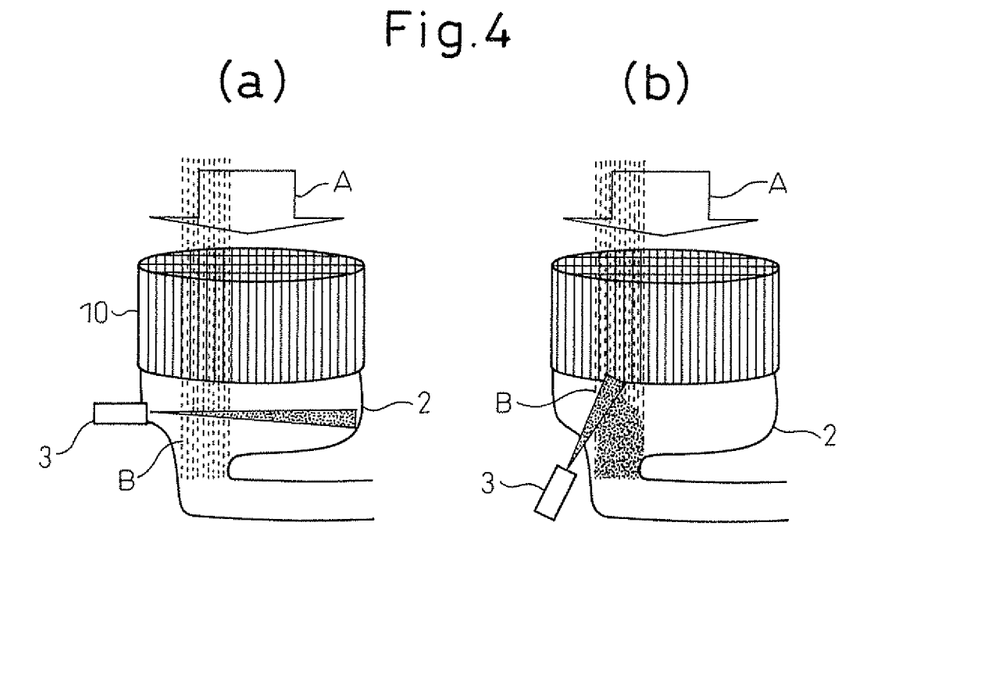
FIG. 4(a) is a view schematically illustrating the constitution of an embodiment of when the invention is applied to the device for purifying exhaust gas of an internal combustion engine.
FIG. 4(b) is a view schematically illustrating the constitution of an embodiment that causes inconvenience.

This also holds for the direction of injection. That is, the additive injected in a direction of injection shown in FIG. 4(a) can be effectively mixed and vaporized in the exhaust gas by utilizing the intense whirling current generated in the connection passage portion 2. However, the additive injected in a direction of injection shown in FIG. 4(b) is discharged into the exhaust pipe 7 being carried by the flow B, and cannot be sufficiently mixed into the exhaust gas.

Figure 5:
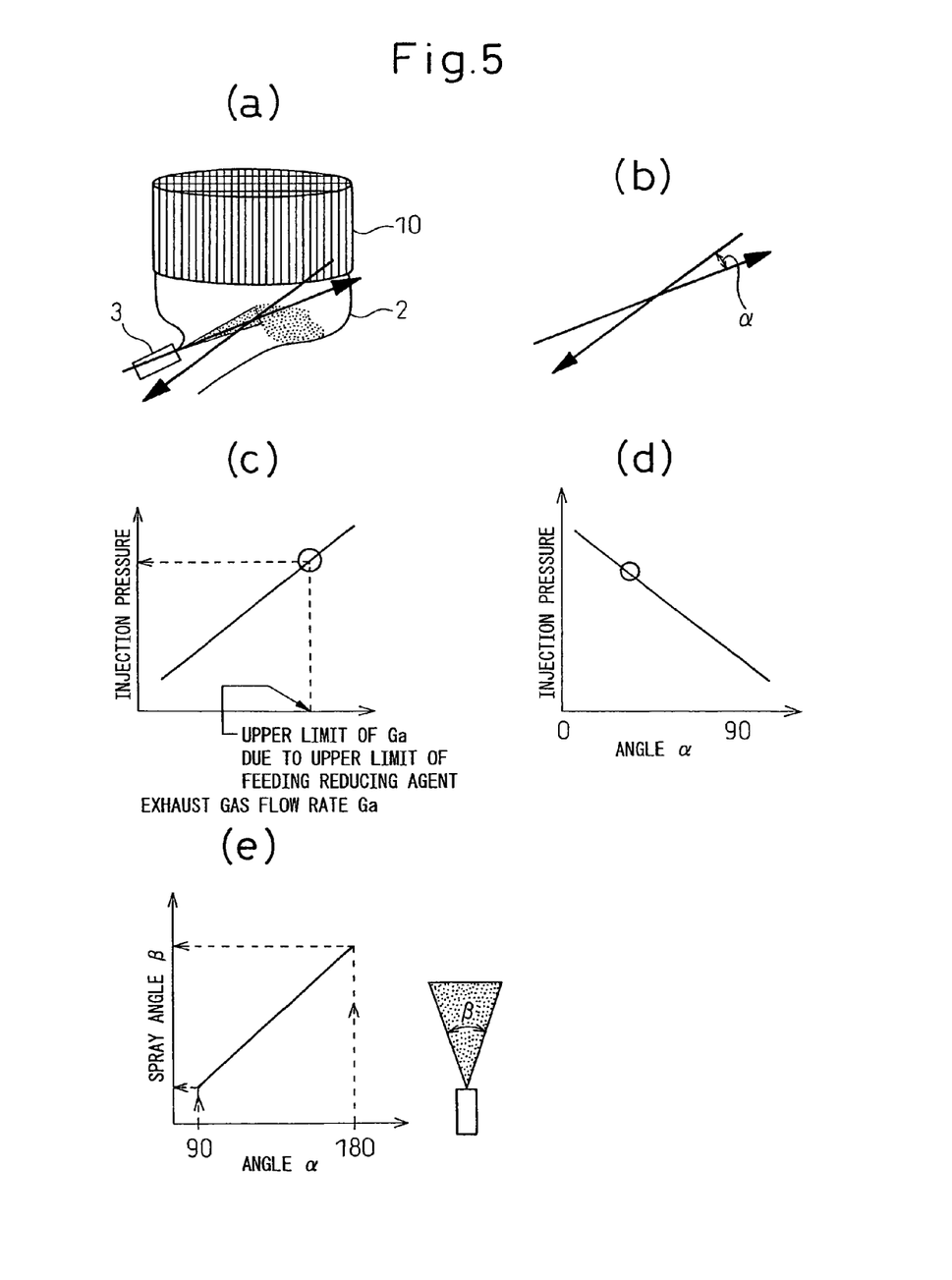
FIGS. 5(a), 5(b), 5(c), 5(d) and 5(e) are views schematically illustrating the constitution of an embodiment of when the invention is applied to the device for purifying exhaust gas of an internal combustion engine.

FIGS. 5(a), (b), (c), (d) and (e) illustrate a case where the injected additive arrives at the opposing wall surface of the connection passage portion 2. Referring to FIGS. 5(a) and (b), if the angle subtended by the direction of injection and the direction of flow in the connection passage portion 2 is denoted by α, there is a relationship shown in FIG. 5(d) between the injection pressure and the angle α when the additive arrives at the opposing wall surface of the connection passage portion 2. That is, the smaller the angle α or, in other words, the more the direction of injection is against the direction of the exhaust gas flow through the connection passage portion 2, the larger the injection pressure must be. Further, the amount of feeding the additive has been determined for the exhaust gas flow rate Ga. As shown in FIG. 5(c), therefore, the injection pressure, too, must be increased with an increase in the exhaust gas flow rate Ga. Therefore, if the exhaust gas flow rate Ga is determined, the injection pressure is determined from FIG. 5(c) and the direction of injection is determined from 5(d) so as to obtain the injection pressure. Namely, the direction of attaching the injection port is determined. As shown in FIG. 5(c), however, there is an upper limit on the exhaust gas flow rate Ga that is to be treated and, therefore, there is an upper limit on the injection pressure of the injection means 3; i.e., the injection pressure of the injection means 3 is set to be not larger than the upper-limit injection pressure. Further, if the angle α subtended by the direction of injection and the direction of flow in the connection passage portion 2 lies in a range of 90 degrees<α<180 degrees, the whirling distance of the exhaust gas that can be utilized becomes short, and the additive easily flows out without being diffused in the exhaust gas to a sufficient degree. It is, therefore, desired to promote the mixing and vaporization of the additive into the exhaust gas by increasing the spray angle β as shown in FIG. 5(e).

Figure 9:
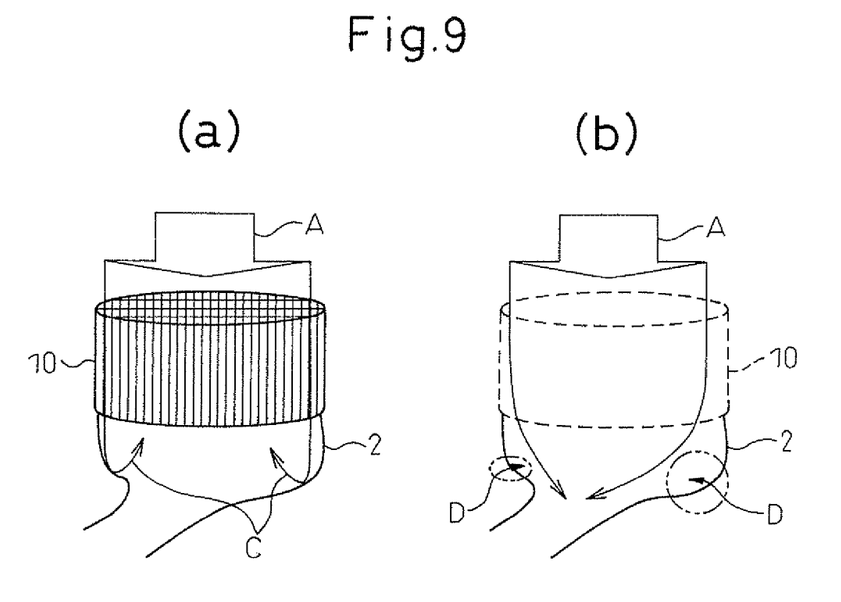
FIG. 9(a) is a view schematically illustrating the constitution of an embodiment of when the invention is applied to the device for purifying exhaust gas of an internal combustion engine.
FIG. 9(b) is a view illustrating a case where inconvenience occurs due to a constitution different from the present invention.

In the above constitution, presence of the catalyst 10 is indispensable on the upstream of the connection passage portion 2. That is, when the catalyst is present on the upstream of the connection passage portion 2 as shown in FIG. 9(a), the exhaust gas flow spreads in the connection passage portion 2 to generate a flow C, and a good whirling current is formed as shown in FIG. 8. However, when no catalyst is present on the upstream of the connection passage portion 2 as shown in FIG. 9(b), dead volumes D are formed in the connection passage portion 2, and a good whirling current shown in FIG. 8 is not generated.

Figure 10:
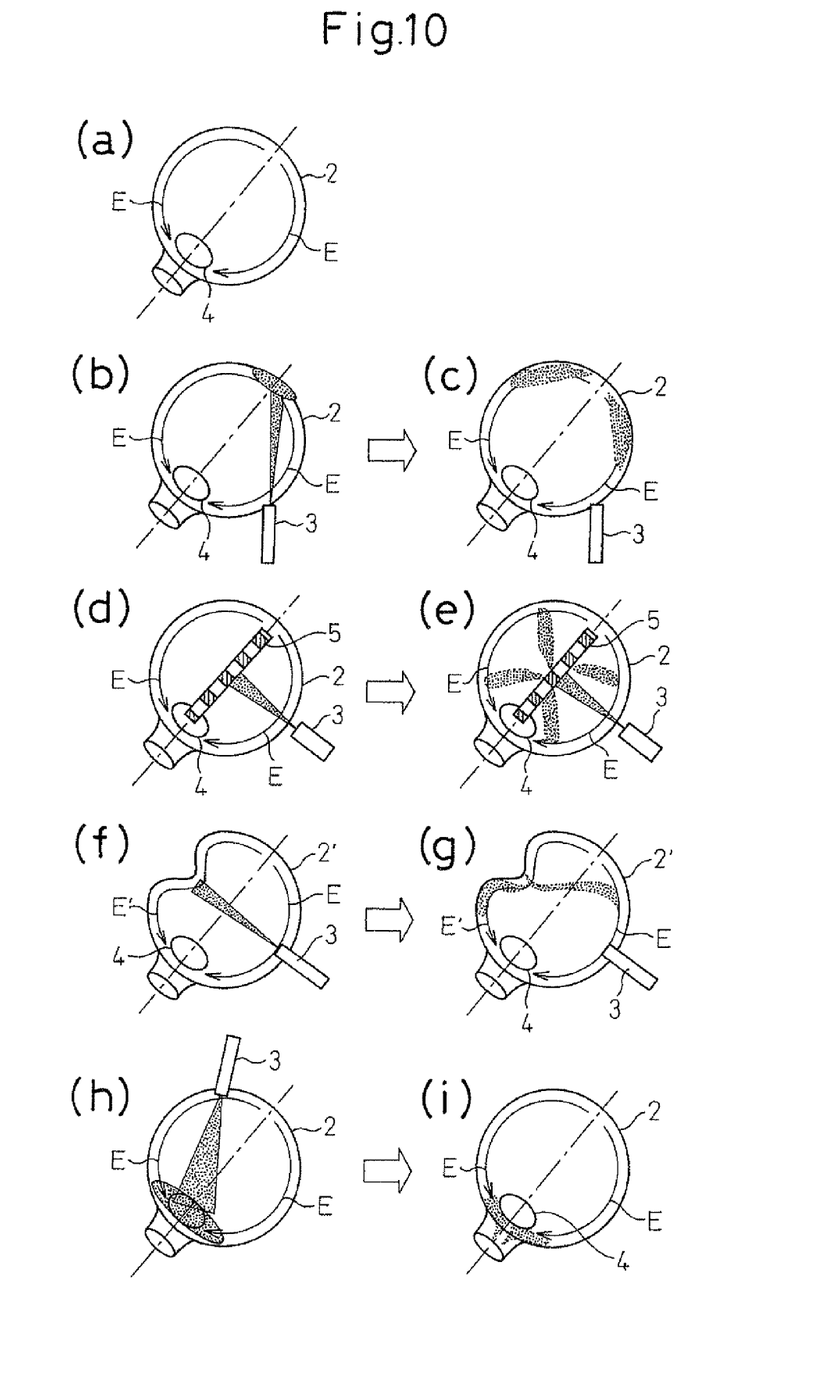
FIGS. 10(a) to 10(i) are top views schematically illustrating the constitution of an embodiment of when the invention is applied to the device for purifying exhaust gas of an internal combustion engine.

FIGS. 10(a) to (i) are top views of the connection passage portions 2 to illustrate various embodiments for favorably mixing the additive into the exhaust gas in the connection passage portion 2. FIG. 10(a) shows a whirling current E-E of the exhaust gas in the connection passage portion 2. The exhaust gas whirls being divided into two directions facing against each other in the connection passage portion 2, and is discharged through the outlet 4 to head into the exhaust pipe 7 (see FIGS. 6 and 7). When injected from the injection means 3 as shown in FIG. 10(b), the additive is diffused and mixed as shown in FIG. 10(c) being carried by the whirling current E-E. Further, when a punch metal 5 is inserted in the connection passage portion 2 in the direction of diameter thereof as shown in FIG. 10(d), the additive is dispersed by the punch metal 5 as shown in FIG. 10(e) and is, thereafter, diffused and mixed being carried by the whirling current E-E. Here, if the punch metal is arranged in a direction of diameter to symmetrically divide the whirling current E-E into the right and left parts as shown, the center flow line of the exhaust gas becomes in parallel with the punch metal to make it possible to avoid the occurrence of pressure loss caused by the insertion of punch metal. Further, when the shape of the connection passage portion 2 is deformed and the additive is so injected as to come in collision with the deformed portion as shown in FIG. 10(*f*), the additive is diffused and mixed as shown in FIG. 10(*g*). When the additive is injected toward the outlet 4 of the connection passage portion 2, it becomes difficult to provide a sufficiently large diffusion distance shown in FIGS. 10(*b*) and (*c*). In this case, therefore, the additive is injected over a wide spray angle as shown in FIG. 10(*h*) so as to be carried by the whirling currents E-E in the directions opposite to each other as shown in FIG. 10(*i*) to improve the diffusion performance by utilizing the collision of when the currents join together.

Figure 11:
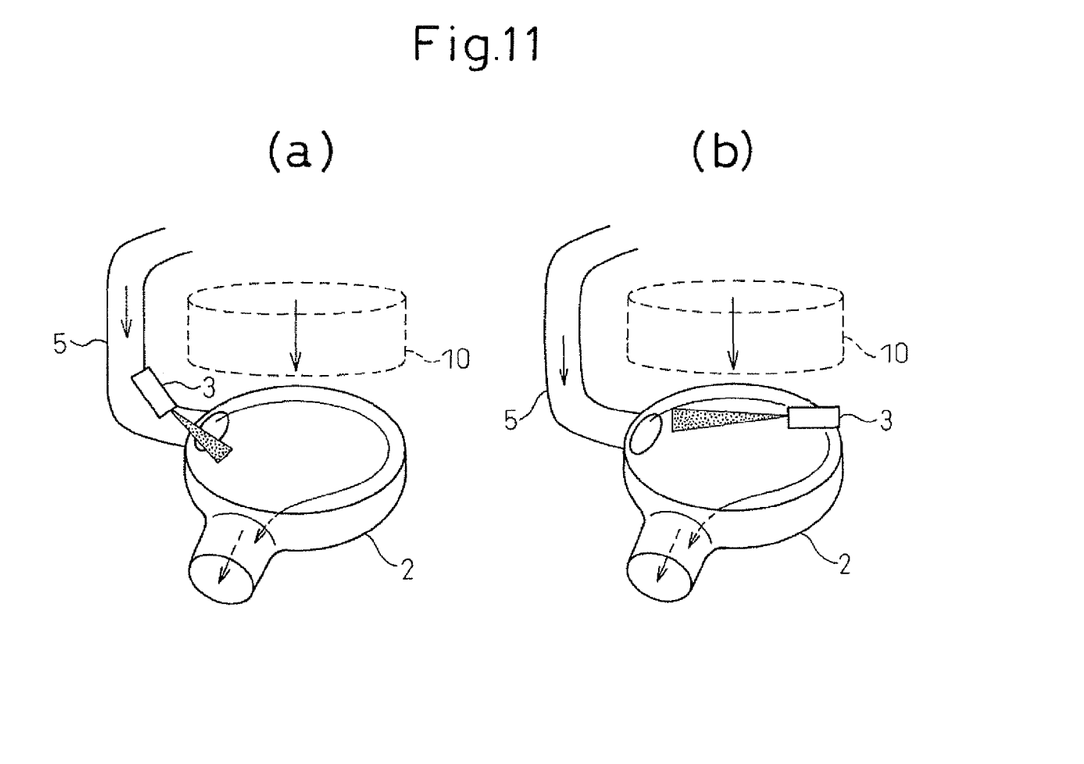
FIGS. 11(a) and 11(b) are views schematically illustrating the constitution of another embodiment of when the invention is applied to the device for purifying exhaust gas of an internal combustion engine.

FIGS. 11(*a*) and (*b*) illustrate an embodiment in which a bypass passage 5 joins to the connection passage portion 2 detouring the upstream device for purifying exhaust gas, and the injection port of the injection means is disposed being headed to the joining portion to inject the additive.

That is, in FIGS. 11(*a*) and (*b*), the bypass passage 5 joins to the connection passage portion 2 detouring the upstream device for purifying exhaust gas, the additive is added to near the joining portion, and the additive and the exhaust gas are effectively mixed together by utilizing the whirling current of the exhaust gas created by the confluence. Here, to prevent the additive from clogging in the form of soot in the injection means, it is advantageous if the additive is injected along the direction in which the bypass flow enters into the connection passage portion.

Figure 12:
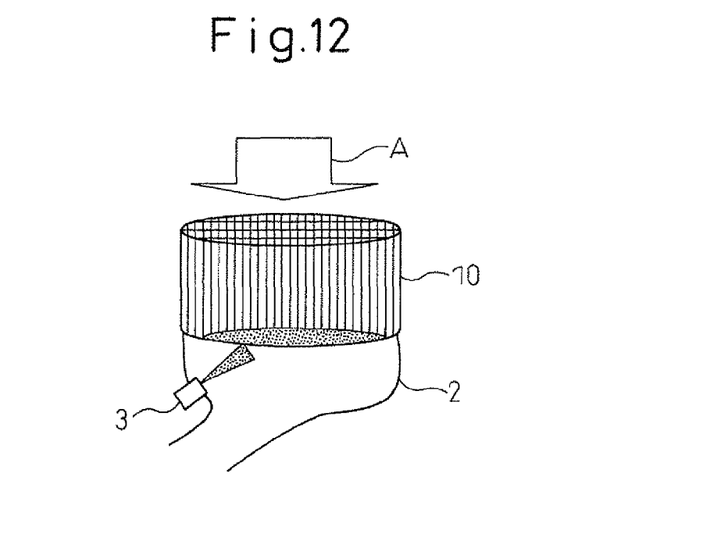
FIG. 12 is a view schematically illustrating the constitution of a further embodiment of when the invention is applied to the device for purifying exhaust gas of an internal combustion engine.

When the downstream device for purifying exhaust gas is provided with a catalyst that executes the selective catalytic reduction by adding urea like the SCR device 20' of FIG. 7, it is advantageous if the injection port of the injection means 3 is disposed being headed to the lower end portion of the catalyst 10 of the upstream device for purifying exhaust gas, and injects the urea so as to come in collision with the lower end portion of the catalyst 10 as shown in FIG. 12.

That is, in FIG. 12, when the downstream device for purifying exhaust gas is equipped with the catalyst that executes the selective catalytic reduction by adding urea like the SCR device 20' of FIG. 7, no heat is generated by the urea that is used for the selective catalytic reduction even when it comes in contact with the catalyst 10 on the upstream side. Therefore, the urea is positively brought into collision with the catalyst 10 on the upstream side to promote the hydrolysis of the urea by utilizing the temperature of the catalyst bed on the upstream side and to improve the diffusion of ammonia generated by the hydrolysis into the exhaust gas. The diffusion performance can be further improved by the mixing effect of when the urea comes in collision with the catalyst 10 on the upstream side.

Figure 13:
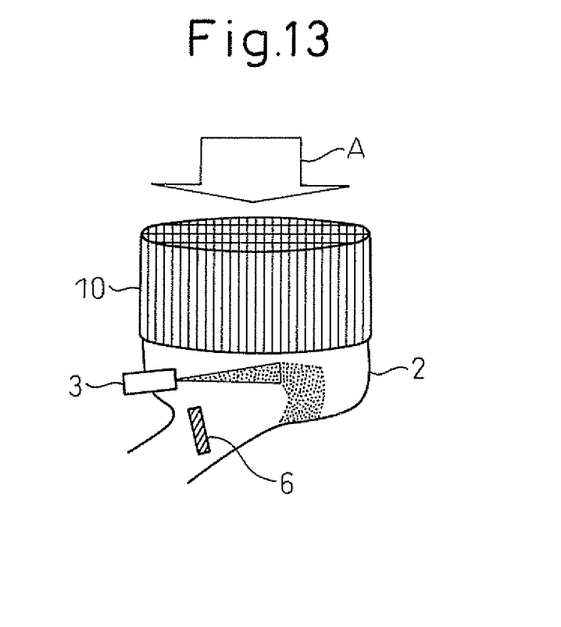
FIG. 13 is a view schematically illustrating the constitution of a still further embodiment of when the invention is applied to the device for purifying exhaust gas of an internal combustion engine.

In the above constitution, a diffuser board 6 is provided in the connection passage portion 2 as shown in FIG. 13 to promote the mixing of the injected additive with the exhaust gas and to, further, improve the diffusion of the additive in the exhaust gas.

Namely, when the additive is to be mixed and vaporized in the exhaust gas in the connection passage portion 2 of from the catalyst 10 to the exhaust pipe 7 (see FIGS. 6 and 7), the diffuser board 6 is arranged in the connection passage portion 2 to further promote the mixing of additive into the exhaust gas. Since the velocity of flow of the exhaust gas is slow in the connection passage portion 2, arrangement of the diffuser board 6 causes little pressure loss. Therefore, the exhaust gas and the additive can be homogeneously mixed together within the connection passage portion 2, and the length of the exhaust pipe 7 can be shortened downstream of the connection passage portion 2.

Figure 14:
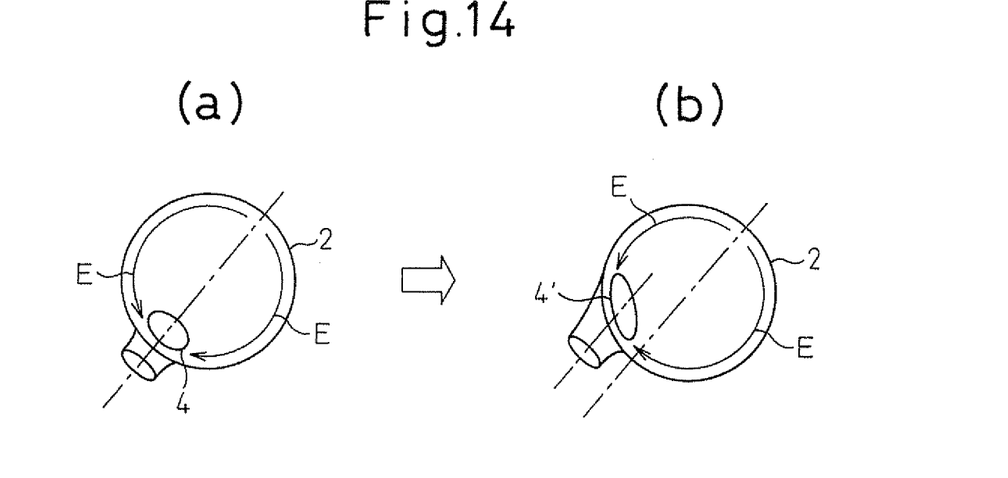
FIG. 14 is a view schematically illustrating the constitution of a yet further embodiment of when the invention is applied to the device for purifying exhaust gas of an internal combustion engine, wherein 14(a) is the same view as FIGS. 10(a) and 14(b) is the view schematically illustrating the constitution of the embodiment in comparison with 14(a)

As shown in FIG. 14(*b*), further, the connection passage portion 2 is so formed that the center axis of the exhaust pipe 7 (see FIGS. 6 and 7) in the direction in which the exhaust gas flows is not in parallel with, and does not intersect, the center axis of the upstream device for purifying exhaust gas. This makes it possible to further promote the mixing of additive in the exhaust gas.

That is, in FIG. 14(*a*) which is a top view of the connection passage portion 2, the whirling current E-E whirls symmetrically on the right and left sides, flows out through the exhaust outlet 4, and flows into the exhaust pipe 7. As shown in FIG. 14(*b*), the connection passage portion 2 is so formed that the center axis of the exhaust pipe 7 (see FIGS. 6 and 7) in the direction in which the exhaust gas flows does not go through the center of the connection passage portion 2 so that the whirling current E-E becomes asymmetrical in the connection passage portion 2, and the whirling current E on one side is caused to whirl to a sufficient degree in the connection passage portion 2. Thus, it is possible to further improve the effect of mixing the additive into the intense whirling current generated in the connection passage portion 2 of from the catalyst 10 (see FIG. 8) on the upstream side to the exhaust pipe 7.

In the above constitution, the additive is injected from the injection means 3 by controlling the amount of injection at the time of addition or the interval of injection. However, the injection of the additive has been controlled by taking into consideration only the temperature of the exhaust gas at the inlet of the catalyst 20 or 20' (see FIGS. 6 and 7) of the downstream device for purifying exhaust gas. Even when the additive is vaporized just before the catalyst 20 or 20' of the downstream device for purifying exhaust gas, however, it is probable that the liquid film may have been formed in the exhaust pipe 7 immediately after the injection means 3 causing the additive to stay or soot to deposit. Therefore, by taking into consideration the area on where the additive deposits, wall temperature at the position of deposition, amount of injection of the additive and interval of injection which are main factors of forming liquid film, the bed temperature of the catalyst 12, 13 of the upstream device 1, 1' for purifying exhaust gas is elevated so that the liquid film will not be formed in the exhaust pipe 7 immediately after the additive injection means 3.

Figure 15:
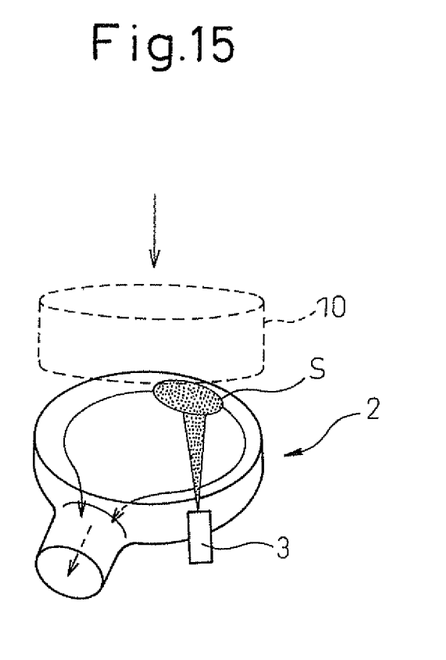
FIG. 15 is a view schematically illustrating the constitution of a further embodiment of when the invention is applied to the device for purifying exhaust gas of an internal combustion engine.

In the above-mentioned case as shown in FIG. 15, the area S of the wall surface of the connection passage portion 2 on where the injected additive deposits varies depending upon the exhaust gas flow rate Ga and the position of addition. Therefore, the injection control means is provided, in advance, with an operation map for finding the area S of the wall surface on where the additive deposits based on the area of the wall surface at where the injected additive arrives and the exhaust gas flow rate Ga at the time of injection.

Figure 16:
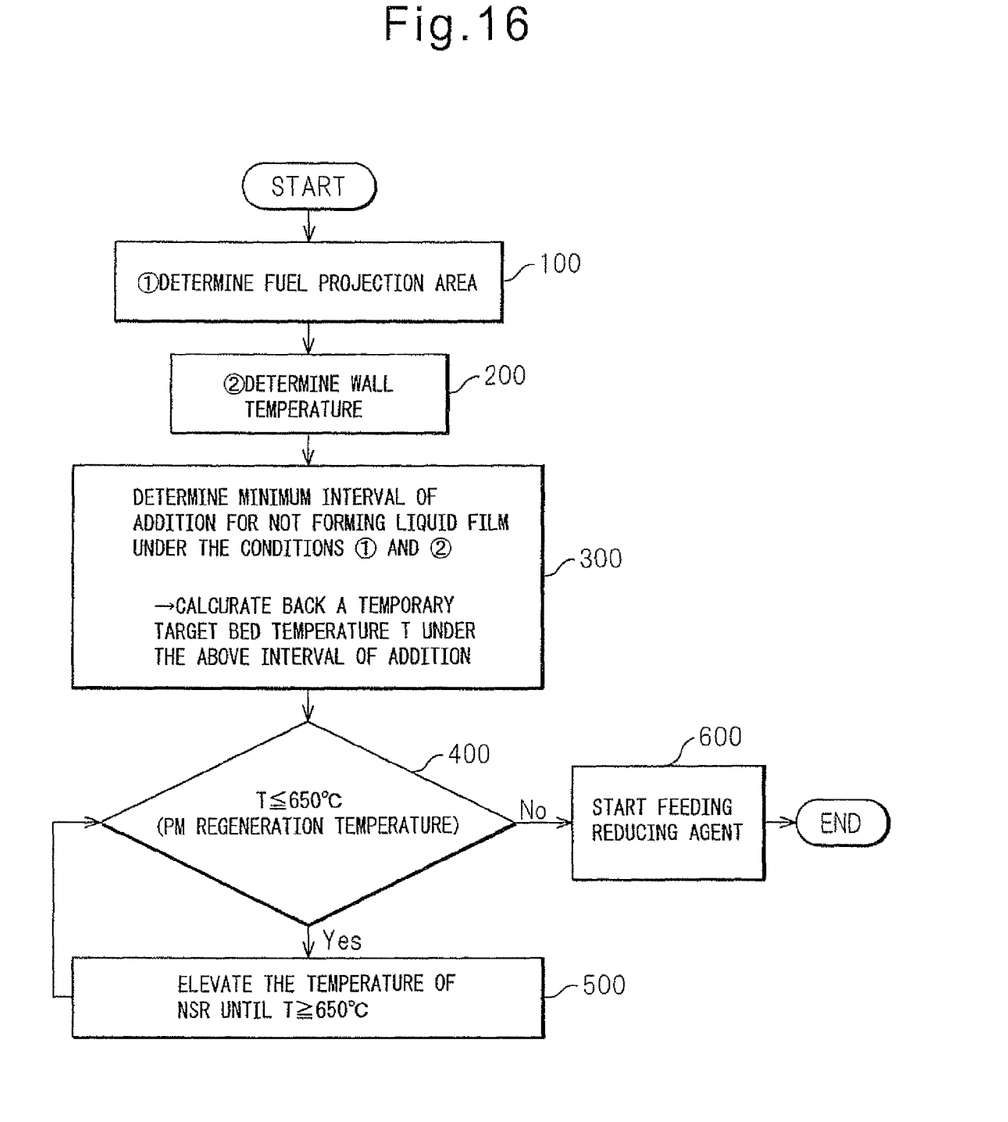
FIG. 16 is a flowchart schematically illustrating the constitution of a further embodiment of when the invention is applied to the device for purifying exhaust gas of an internal combustion engine.

FIG. 16 is a flowchart for controlling the amount of additive injection or the interval of injection. Namely, the area S of the wall surface of the connection passage portion 2 on where the additive deposits is determined at step 100, and the wall surface temperature of the connection passage portion 2 is determined at step 200. The wall surface temperature can be estimated from a value detected by an exhaust gas temperature sensor. At step 300, a minimum interval of additive addition for not forming liquid film in the exhaust pipe 7 is determined from the area S of deposition and the wall surface temperature, and a target bed temperature T of the catalysts 20, 20' (see FIGS. 6 and 7) of the downstream device for purifying exhaust gas is calculated back from the minimum interval of additive addition. If the target bed temperature T is lower than a regeneration temperature of the catalyst 20, 20' of the downstream device for purifying exhaust gas at step 400, the routine proceeds to step 500 where the bed temperature of the catalyst 12, 13 of the upstream device 1, 1' for purifying exhaust gas is elevated until it become higher than the regeneration temperature of the catalyst 20, 20'. If the target bed temperature T becomes higher than the regeneration temperature of the catalyst 20, 20', the routine proceeds to step 600 to start injecting the additive.

Figure 17:
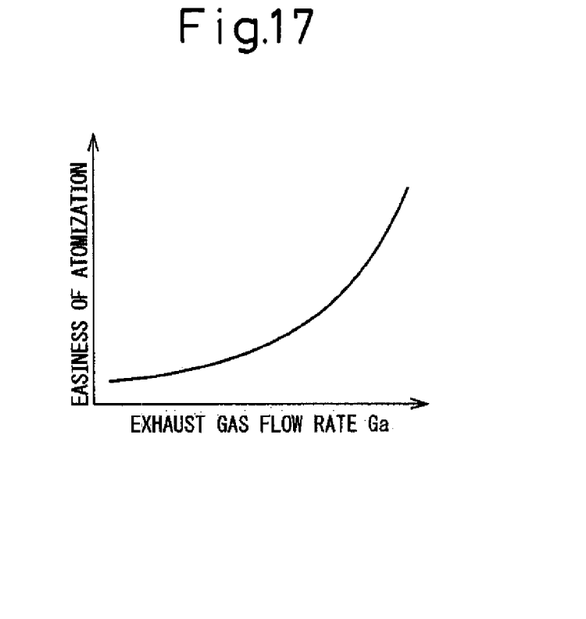
FIG. 17 is a diagram supplementing the flowchart of FIG. 16.

In the above control, when the exhaust gas flow rate Ga is large, a phenomenon occurs in which the additive comes in collision with the exhaust gas flow and is atomized as shown in FIG. 17. That is, the liquid film is little formed in the exhaust pipe 7. Therefore, if the area of deposition and the wall temperature remain the same, the minimum interval of adding the additive to the catalyst becomes long with an increase in the exhaust gas flow rate Ga, and no liquid film is formed in the exhaust pipe 7 despite the bed temperature of the catalyst 12, 13 of the upstream device 1, 1' for purifying exhaust gas is low. In determining the minimum interval of additive addition at step 300, therefore, it is desired to correct the minimum interval of addition depending upon the exhaust gas flow rate Ga.

The catalyst bed temperature was so far estimated from a value detected by the exhaust gas temperature sensor disposed downstream of the catalyst, i.e., from the temperature of the exhaust gas that has passed through the catalyst. However, in the present invention, if the exhaust gas temperature sensor is disposed in the connection passage portion 2, the liquid additive may deposit on the exhaust gas temperature sensor causing the measurement to become erroneous. Besides, since the additive has not been completely vaporized in the connection passage portion 2, the amount of vaporization cannot be learned. Therefore, the catalyst bed temperatures of the catalysts 12, 13 cannot be accurately estimated. It is, therefore, desired to dispose the exhaust gas temperature sensor in the exhaust pipe 7 downstream of the connection passage portion 2 to measure the exhaust gas temperature after the additive is completely vaporized in the exhaust gas, and to estimate the catalyst bed temperatures of the catalysts 12, 13 based on the latent heat of vaporization of when the liquid additive is completely transformed into a gas.

In this case, if the position where the exhaust gas temperature sensor is disposed in the exhaust pipe 7 is too separated away from the connection passage portion 2, the exhaust gas temperature drops due to the radiation of heat. It is, therefore desired that the position where the exhaust gas temperature sensor is disposed is close to the connection passage portion. In one embodiment, a preferred position of disposition is 0 mm to 150 mm downstream of the outlet of the connection passage portion 2.

Figure 18:
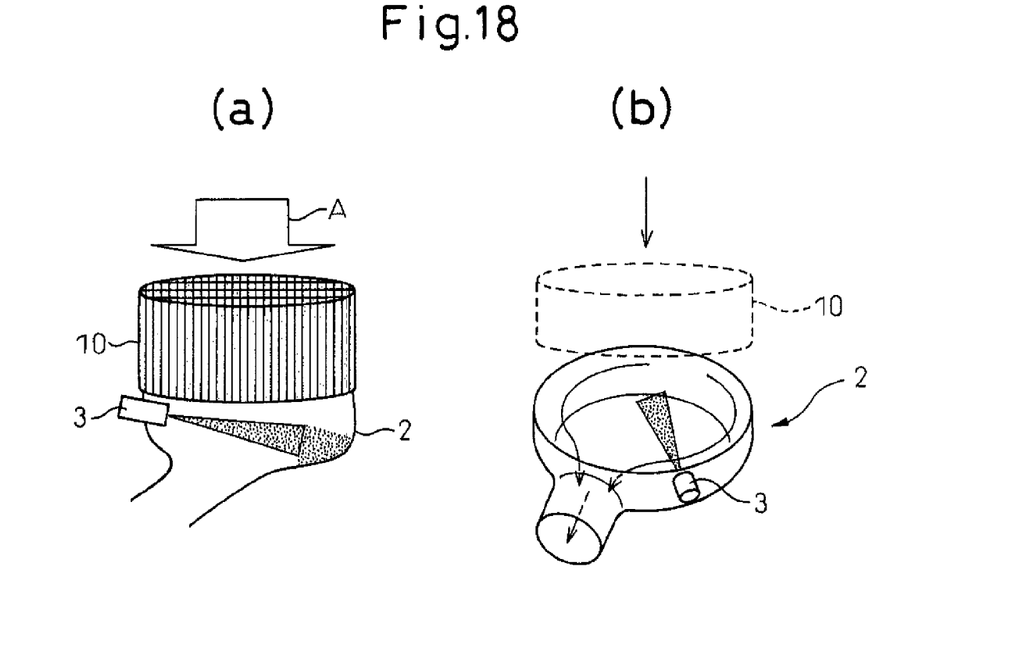

FIG. 18 illustrates a further embodiment of favorably mixing the additive into the exhaust gas in the connection passage portion 2, wherein (a) is a view from the direction of cross section of the connection passage portion 2 and (b) is a perspective view from a tilted upper side of the connection passage portion 2. Namely, in this embodiment, the additive is injected from the injection means 3 aiming at a curved portion of the wall surface opposed to the injection means in the connection passage portion 2 and leading to the exhaust pipe. This permits the additive to come in contact with a wide range of the wall surface of the connection passage portion 2, and is advantageous for favorably promoting the mixing and vaporization of the additive into the exhaust gas.

DESCRIPTION OF REFERENCE NUMERALS 1, 1' upstream devices for purifying exhaust gas
2 connection passage portion
3 additive injection means
4, 4' exhaust outlet
5 bypass passage
6 diffuser board
7 exhaust pipe
10 catalyst
11 CCo (oxidizing catalytic converter)
12 NSR catalyst (NOx storage-reduction catalyst)
13 DPF
20 DPF
20' SCR device or NSR catalyst
A exhaust flow line
B gas flow directly flowing into the exhaust pipe
C exhaust gas flow spreading in the connection passage portion
D dead volume
E whirling current
S fuel projection area

The invention claimed is:

1. A device for purifying exhaust gas of an internal combustion engine in which an upstream device for purifying exhaust gas and a downstream device for purifying exhaust gas provided in the engine exhaust passage are connected together through an exhaust pipe having a sectional area smaller than that of said upstream device for purifying exhaust gas and that of said downstream device for purifying exhaust gas, said device for purifying exhaust gas of an internal combustion engine including:
   injection means provided between said upstream device for purifying exhaust gas and said downstream device for purifying exhaust gas, and for injecting into the exhaust passage an additive that reacts with the specific components in the exhaust gas; and
   a connection passage portion for connecting the exhaust outlet of a catalyst in said upstream device for purifying exhaust gas to said exhaust pipe; wherein
   said connection passage portion is so formed that the center axis of said upstream device for purifying exhaust gas in the direction in which the exhaust gas flows is not aligned with the center axis of said exhaust pipe in the direction in which the exhaust gas flows;
   said injection means is arranged in said connection passage portion so that said additive arrives at the opposing wall surface of said connection passage portion traversing the exhaust gas flow from said upstream device for purifying exhaust gas; and
   said additive is mixed into said exhaust gas.

2. The device for purifying exhaust gas of an internal combustion engine according to claim 1, wherein said connection passage portion includes a passage portion which gradually decreases the sectional area of the passage from the sectional area of the exhaust outlet of the catalyst in said upstream device for purifying exhaust gas.

3. The device for purifying exhaust gas of an internal combustion engine according to claim 1, wherein a diffuser board is provided in said connection passage portion for promoting the mixing of said injected additive with said exhaust gas.

4. The device for purifying exhaust gas of an internal combustion engine according to claim 1, wherein said connection passage portion is so formed that the center axis of said exhaust pipe in the direction in which the exhaust gas flows is not in parallel with, and does not intersect, the center axis of said upstream device for purifying exhaust gas.

5. The device for purifying exhaust gas of an internal combustion engine according to claim 1, wherein provision is made of control means for controlling the amount of injection or the interval of injection of when said additive is added, and said control means determines the injection conditions under which said injected additive does not form liquid film in said exhaust pipe based on the area of the exhaust passage wall surface on where said injected additive deposits and the temperature of said wall surface or the temperature of the exhaust gas, and elevates the temperature of the catalyst bed of the catalyst in said upstream device for purifying exhaust gas.

6. The device for purifying exhaust gas of an internal combustion engine according to claim 1, wherein provision is made of a temperature sensor for measuring the temperature of the exhaust gas in said exhaust pipe downstream of said connection passage portion, and said measured temperature of the exhaust gas is corrected based on the latent heat of vaporization of said additive that is injected, in order to find the temperature of said upstream device for purifying exhaust gas.

7. The device for purifying exhaust gas of an internal combustion engine according to claim 1, wherein said additive is injected aiming at a curved portion of the opposing wall surface of said connection passage portion leading to said exhaust pipe.

8. The device for purifying exhaust gas of an internal combustion engine according to claim 1, wherein said connection passage portion includes a passage portion which gradually decreases the sectional area of the passage from the sectional area of the exhaust outlet of the catalyst in said upstream device for purifying exhaust gas, and said additive is injected aiming at a curved portion of the opposing wall surface of said connection passage portion leading to said exhaust pipe.

9. A device for purifying exhaust gas of an internal combustion engine in which an upstream device for purifying exhaust gas and a downstream device for purifying exhaust gas provided in the engine exhaust passage are connected together through an exhaust pipe having a sectional area smaller than that of said upstream device for purifying exhaust gas and that of said downstream device for purifying exhaust gas, said device for purifying exhaust gas of an internal combustion engine including:
   injection means provided between said upstream device for purifying exhaust gas and said downstream device for purifying exhaust gas, and for injecting into the exhaust passage an additive that reacts with the specific components in the exhaust gas; and
   a connection passage portion for connecting the exhaust outlet of a catalyst in said upstream device for purifying exhaust gas to said exhaust pipe; wherein
   said connection passage portion is so formed that the center axis of said upstream device for purifying exhaust gas in the direction in which the exhaust gas flows is not aligned with the center axis of said exhaust pipe in the direction in which the exhaust gas flows; and
   said injection means is arranged in said connection passage portion;
   wherein provision is further made of a bypass passage which joins to said connection passage portion detouring said upstream device for purifying exhaust gas, said injection means injects said additive toward a portion where said connection passage portion and said bypass passage are joined together, and said additive is mixed into said exhaust gas.

10. A device for purifying exhaust gas of an internal combustion engine in which an upstream device for purifying exhaust gas and a downstream device for purifying exhaust gas provided in the engine exhaust passage are connected together through an exhaust pipe having a sectional area smaller than that of said upstream device for purifying exhaust gas and that of said downstream device for purifying exhaust gas, said device for purifying exhaust gas of an internal combustion engine including:
   injection means provided between said upstream device for purifying exhaust gas and said downstream device for purifying exhaust gas, and for injecting into the exhaust passage an additive that reacts with the specific components in the exhaust gas; and
   a connection passage portion for connecting the exhaust outlet of a catalyst in said upstream device for purifying exhaust gas to said exhaust pipe; wherein
   said connection passage portion is so formed that the center axis of said upstream device for purifying exhaust gas in the direction in which the exhaust gas flows is not aligned with the center axis of said exhaust pipe in the direction in which the exhaust gas flows; and
   said injection means is arranged in said connection passage portion;
   wherein said downstream device for purifying exhaust gas is provided with a catalyst that executes the selective catalytic reduction by adding urea, and said injection means injects said additive toward the lower end portion of the catalyst in said upstream device for purifying exhaust gas so as to come into collision with the lower end portion of said catalyst, and said additive is mixed into said exhaust gas.

* * * * *